United States Patent Office 3,317,559
Patented May 2, 1967

3,317,559
α-AMINO ACID ESTERS OF N-HYDROXYSUCCINI-
MIDE AND PREPARATION AND USE IN PEP-
TIDE SYNTHESIS
George Washington Anderson, Upper Saddle River, N.J.,
assignor to American Cyanamid Company, Stamford,
Conn., a corporation of Maine
No Drawing. Filed Aug. 23, 1963, Ser. No. 304,256
6 Claims. (Cl. 260—326.3)

This invention relates to new amino acid esters, their preparation and use in the synthesis of peptides. More particularly, it relates to N-hydroxysuccinimide esters of α-amino acids and the improved method of peptide synthesis using these esters.

Development of new and superior methods of peptide synthesis is a major objective of present day research in organic chemistry. High yields and ready means of eliminating by-products are essentials of any superior peptide synthesis because many synthetic steps are necessary for synthesis of large peptides. Each amino acid has to be jointed in proper sequence to form any desired complex. With such a high premium on yields and by-product elimination, each improvement thereof in peptide synthesis is of critical importance. The N-hydroxysuccinmide esters of this invention and the methods of peptide synthesis by which they are used represent such an advance.

The novel esters of this invention may be illustrated by the following formula:

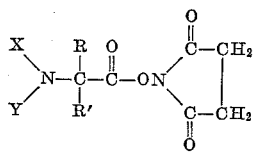

wherein X is a monovalent protective radical selected from the group consisting of benzyloxycarbonyl, tertiary-butyloxycarbonyl, triphenylmethyl and trifluoroacetyl, Y is hydrogen, or X and Y together represent a divalent protective radical such as phthaloyl and R and $R^1$ represent the residue remaining of an α-amino acid.

The starting materials in preparing the novel esters of the present invention are α-amino acids. One large group of α-amino acids is composed of the naturally occurring α-amino acids described, for example, by P. Karrer, Organic Chemistry, second English edition, Elsevier Publishing Company, Inc., New York, 1946. Among the naturally occurring amino acids may be mentioned, for example, alanine, serine, aminobutyric acid, cystine, cysteine, methionine, norvaline, valine, norleucine, leucine, isoleucine, phenylalanine, tyrosine, dihydroxyphenylalanine, tryptophane, arginine, lysine, hydroxylysine, ornithine, aspartic acid, asparagine, glutamic acid, hydroxyglutamic acid, glutamine, glycine, histidine, thiolhistidine, proline, hydroxyproline, tyrosine, diiodotyrosine, thyroxine and threonine. Since these are α-aminocarboxylic acids, they can be illustrated by the following formula:

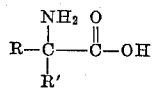

wherein R and $R^1$ are the residue remaining of the α-amino acids described above.

While the above are all α-amino carboxylic acids the additional functional groups of polyfunctional amino acids (such as, for example, the second carboxyl function of glutamic acid) would be protected in the methods of this invention.

The term "amino acid derivative" and "peptide derivative" mean respectively conventional esters; for example, methyl, ethyl, n-propyl, iso-propyl, t-butyl, benzyl, phenylethyl, β-nitrobenzyl and the like, or salt cations such as the alkali metals sodium, potassium, lithium, tertiary amine salts such as trimethylammonium, triethylammonium, tripropylammonium and the like.

The novel esters of this invention may be prepared by reacting N-hydroxysuccinimide with an N-protected α-amino acid in the presence of N,N'-dicyclohexyl carbodiimide as follows:

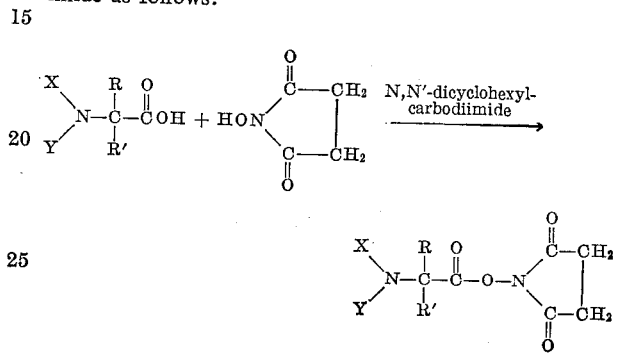

wherein X, Y, R and $R^1$ are as hereinbefore defined.

Ordinarily, the foregoing reaction is carried out by dissolving approximately equimolar quantities of the N-hydroxysuccinimide and N-conventionally protected α-amino acid in an appropriate solvent preferably a non aqueous solvent at room temperature or below, then dissolving approximately a 10% excess of an equimolar quantity of N,N'-dicyclohexylcarbodiimide in the solution while maintaining the reduced temperature, and then maintaining the resulting solution at reduced temperature for a period of time ranging from an hour to several days, for the reaction to proceed to substantial completion. Appropriate solvents are for example tetrahydrofuran, dioxane, dimethoxyethane, dimethylformamide, and the like. In general, the temperature at which the reaction is carried out ranges from about —5° C. to about 25° C. After the reaction has proceeded to substantial completion any by-products, such as N,N'-dicyclohexylurea, ordinarily may be separated from the desired ester product by conventional methods making use of differential solubilities. The foregoing reaction is particularly exemplified by the preparations described hereinbelow as Examples I–VII inclusive.

The novel N-hydroxysuccinimide esters of this invention are, in general, crystalline, stable, activated esters (see Examples VI and VII) advantageously useful in peptide synthesis particularly under aqueous conditions as described hereinafter.

The method of peptide synthesis of this invention comprises reacting an ester of the invention, prepared as described immediately above, with a derivative of an α-amino acid or derivative of a peptide to form a peptide derivative:

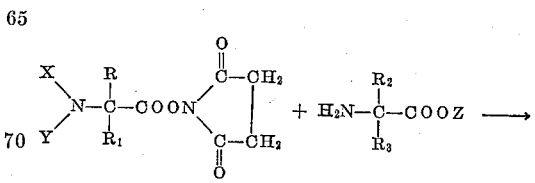

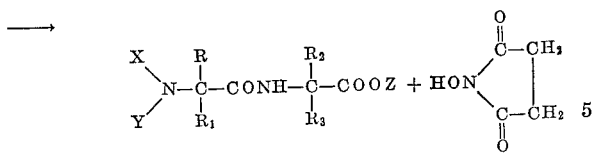

or

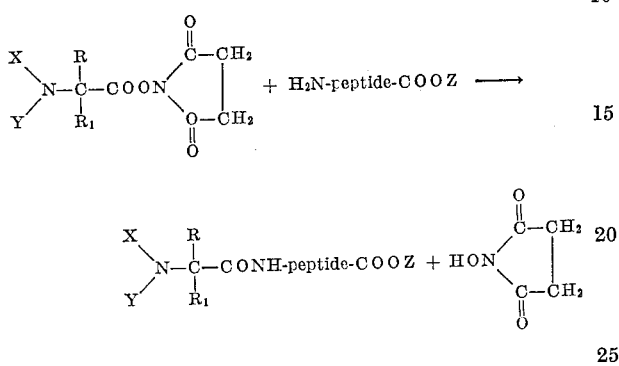

wherein X, Y, R and $R_1$ are as hereinabove defined, $R_2$ and $R_3$ are radicals which characterize the α-amino acid, and Z is a conventional ester group or salt cation.

In the above reaction, when the amino acid derivative or peptide derivative is an ester, the reaction is preferably carried out in a solvent at about 10° to 40° C. and preferably about 15° to 30° C. and the reaction proceeds to substantial completion in 20 minutes to four hours. The by-product N-hydroxysuccinimide is separated from the reaction mixture by making use of the fact of its solubility in water, the desired conventionally protected peptide ester product being insoluble in water. Thus, for example, if a water immiscible solvent is used, the N-hydroxysuccinimide can be extracted from the reaction mixture with water. If a water miscible solvent is used, the reaction mixture is diluted with water causing the desired peptide ester to precipitate from solution and leaving the by-product N-hydroxysuccinimide in solution. These purifications are outlined in Examples VIII–XIII inclusive hereinafter.

When, in the above reaction, the amino acid or peptide derivative is in the form of a salt, the reaction is carried out in an aqueous medium. The temperature, preferably, is about 10° to 40° C. and reaction is substantially complete in 20 minutes to 4 hours. A longer reaction time, such as standing overnight at room temperature, will sometimes improve the yield slightly and is convenient. Acidification of the reaction medium with acid causes the product to precipitate while the by-product N-hydroxysuccinimide remains in solution. This purification is described in Examples XIV–XVIII, inclusive hereinafter.

Examples XIX and XX show that esters of N-hydroxyphthalimide are greatly inferior for peptide synthesis to esters of N-hydroxysuccinimide, principally because of difficulty in removing the water-insoluble by-product N-hydroxyphthalimide.

The following examples illustrate in detail the preparation of the novel esters of this invention and their use in peptide synthesis.

EXAMPLE I

*Preparation of N-hydroxysuccinimide ester of carbobenzoxy-glycine*

N,N'-dicyclohexylcarbodiimide (26 g., 0.126 mole) is added to a solution of carbobenzoxyglycine (26.3 g., 0.126 mole) and hydroxysuccinimide in 250 ml. of dioxane with cooling. The reaction mixture is allowed to stand in the refrigerator overnight. The formed dicyclohexylurea is filtered and washed with dioxane. The filtrate is concentrated under reduced pressure to yield a yellow oil which soon crystallizes. The compound is triturated with ether and filtered to obtain 37.5 g. (97%), melting point 108–111° C. Recrystallization from methylene chloride and petroleum ether yields 33 g. (86%), melting point 113–114° C.

Other carbobenzoxyamino acid derivatives are prepared in a similar manner (Example VI). Dimethoxyethane and dimethylformamide may occasionally be used in place of dioxane and isopropanol is used frequently as as a recrystallization solvent.

EXAMPLE II

*Preparation of N-hydroxysuccinimide ester of tert-butyloxy-carbonyl-L-alanine*

Tert-butyloxycarbonyl-L-alanine (1.32 g., 0.0070 mole) and N-hydroxysuccinimide (0.805 g., 0.0070 mole) are mutually dissolved in 10 ml. of anhydrous dimethoxyethane at 0° C. Then dicyclohexylcarbodiimide (1.59 g., 0.0070 mole+10%) is dissolved with stirring and the solution kept at 0–5° C. for a period of 20 hours.

The urea which has formed is separated by filtration and the filtrate evaporated to dryness in an open dish leaving a crystalline residue of 2.33 g. of crude product. Two successive recrystallizations from isopropanol give the analytically pure product, 1.42 g. (71%), melting point 143°–144° C. Similarly prepared are the compounds described in Example VII.

EXAMPLE III

*Preparation of N-hydroxysuccinimide ester of tritylglycine*

Tritylglycine (6.34 g., 0.020 mole) and hydroxysuccinimide (2.30 g., 0.020 mole) are mutually dissolved in 125 ml. of anhydrous dimethoxyethane. The solution is cooled to 5° C. and dicyclohexylcarbodiimide (4.52 g., 0.020 mole+10% added. After a period of 20 hours at 5° C., the urea is separated by filtration and the filtrate evaporated to dryness leaving a residue of 8.85 g. Recrystallization from isopropanol produces the pure product melting point 145.5–146.5° C.

EXAMPLE IV

*Preparation of N-hydroxysuccinimide ester of phthaloylglycine*

Phthaloylglycine (4.10 g., 0.020 mole) and hydroxysuccinimide (2.30 g., 0.020 mole) are dissolved together in 25 ml. of anhydrous dimethoxyethane. To the ice cold solution is aded dicyclohexylcarbodiimide (4.52 g. 0.020 mole+10% with stirring. After a period of 20 hours at 0° C. the urea is removed by filtration and the filtrate concentrated to dryness by evaporation of the solvent in an open vessel. The residue is recrystallized from isopropanol to yield the analytically pure product, melting point 182–183° C.

EXAMPLE V

*Preparation of N-hydroxysuccinimide ester of trifluoroacetylglycine*

Trifluoroacetylglycine (3.42 g., 0.020 mole) and hydroxysuccinimide (2.30 g., 0.020 mole) are combined in 25 ml. of dimethoxyethane. The resulting solution is cooled to 5° C. and dicyclohexylcarbodiimide (4.52 g., 0.020 mole+10%) is dissolved in the cold solution. After 65 hours at 0° C. the urea is filtered from the mixture which forms and the filtrate evaporated to dryness. The compound is twice recrystallized from isopropanol to yield the analytically pure product, melting point 143°–144° C.

EXAMPLE VI

*Preparation of N-hydroxysuccinimide esters of carbobenzoxyamino acids of the formula*

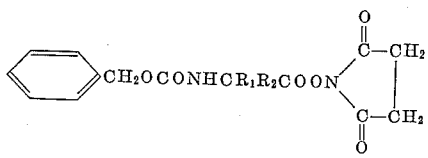

| Carbobenzoxylated Amino Acid or Peptide | Yield, Percent | M.P., °C. | $[\alpha]_d^{25}$ [1] |
|---|---|---|---|
| Glycine | 86 | 113–4 | |
| L-Phenylalanine | 76 | 140–0.5 | −17.3 |
| L-proline | 78 | 90 | −54 |
| L-isoglutamine | 48 | 151–3 | +.975±2.4 |
| L-leucine | 51 | 116–7 | −33.6±2.5 |
| L-alanine | 65 | 123–3.5 | −37.2±2.5 |
| L-valine | 53 | 116–7 | −25.1±2.4 |
| L-isoleucine | 56 | 115.5–6 | −15.5±2.42 |
| L-arginine [2] | 80 | 85–6 | −9.7±2.4 |
| L-methionine | 59 | 101–2 | −15.9±2.4 |
| D-phenylalanine | 76 | 140.5–41 | +15.9±2.48 |
| L-nitroarginyl-L-proline | 50 | 124.5–6 | |
| L-β-cyanoalanine | 52 | 118–9 | −36.8±2.42 |
| L-glutamic acid gamma methyl ester | 53.3 | 107–8 | −23.3±2.5 |

[1] Dioxane was the solvent for all determinations.
[2] Tricarbobenzoxylated.

The above esters were prepared in a manner similar to the preceding Examples I to V.

EXAMPLE VII

*Preparation of N-hydroxysuccinimide esters of t. butyloxycarbonylamino acids of the formula*

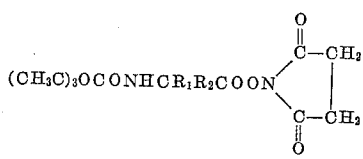

| t. Butyloxycarbonylamino Derivative | Yield, Percent | M.P., °C. | $[\alpha]_d^{25}$ [1] |
|---|---|---|---|
| L-alanine | 71 | 143–144 | −49 c. 2.02 |
| S-benzyl-L-cysteine | 49 | 117–117.5 | −54.0 c. 2.46 |
| Glycine | 62 | 168–170 | |
| L-isoleucine | 59, 61.3 | 92–93 | −26.5 c. 2.00 |
| L-leucine | 48 | 116 | −41.8 c. 2.01 |
| DL-methionine | 65 | 118–119 | |
| L-methionine | 59 | 128–129 | −20.6 |
| D-phenylalanine | 86 | 152–153 | +20.9 c. 2.06 |
| L-phenylalanine | 81 | 152–153 | −19.0 c. 2.03 |
| L-proline | 74, 71, 69 | 135–136 | −55.3 c. 2.02 |
| L-tryptophane | 37 | 153–154 | −22.4 c. 2.05 |
| L-valine | 50, 74.7 | 128–129 | −36.98 c. 1.98 |

[1] Dioxane was solvent for all determinations.

The above esters were prepared in a manner similar to the preceding Examples I to V.

EXAMPLE VIII

*Preparation of tert-butyl phthaloyl-L-methionyl-L-phenyl-alaninate*

The hydroxysuccinimide ester of L-phthaloyl-methionine, prepared in a similar manner to the phthaloyl-glycine ester (Example IV), is treated with a slight excess of tertiarybutyl L-phenylalaninate in methylene chloride solution. After a period of 20 minutes the methylene chloride solution is extracted with 5% sodium bicarbonate solution, 1 N hydrochloric acid solution, dried over anhydrous sodium sulfate and then evaporated to dryness in an open vessel. A crystalline residue remains which is recrystallized from isopropanol to yield the pure product in good yield, melting point 87.5–88.5° C.

EXAMPLE IX

*Preparation of tert-butyl trifluoroacetylglycycl-L-prolinate*

The hydroxysuccinimide ester of trifluoroacetylglycine (1.43 g., 5 mm.) and tert-butyl-L-prolinate (1.77 ml., 10 millimole) are combined in 7 ml. of dimethoxyethane. The solution is poured into 50 ml. of cold water after a period of one-half hour. The pure compound obtained in 79% yield by recrystallization from methylcyclohexane, has a rotation of $[\alpha]_D^{25}$ −81.3±2.5 (c. 2.04 ethanol).

EXAMPLE X

*Preparation of ethyl tert-butyloxycarbonylglycyl-L-phenyl-alanylglycinate*

Ethyl-L-phenylalanylglycinate hydrobromide (2.48 g., 75 millimole), the hydroxysuccinimide ester of tertiary-butyl-oxycarbonylglycine (2.04 g., 75 millimole) and triethylamine (1.05 ml., 75 millimole) are mutually combined in 25 ml. of anhydrous dimethoxyethane. The mixture is stirred for a period of 20 minutes after which it is added to 100 ml. of cold water. The product crystallizes and is collected by filtration. The crude product (2.58 g.) melts at 98–99° C. Recrystallization from alcohol-water yielded the pure tripeptide, melting point 100.5–101.5° C. with a net yield of 79%, $$[\alpha]_D -9.75° \pm 2.46°$$

(c. 2.05 methanol).

EXAMPLE XI

*Preparation of ethyl carbobenzoxy-L-phenylalanyl-L-tyrosinate*

A solution of 1.98 g. (.005 mole) of the N-hydroxysuccinimide ester of carbobenzoxy-L-phenylalanine in 10 ml. of dimethoxyethane is added to a solution of 1.045 g. (.005 mole) of ethyl tyrosinate (L) in 10 ml. of the same solvent. The reaction is allowed to stand for 40 minutes at room temperature and is then diluted with 60 ml. water. The crystals which form immediately are filtered and washed with 10% sodium bicarbonate, water n-hydrochloric acid and water. Crude yield after drying is 2.62 g. (100%), melting point 151–157° C. Two recrystallizations from ethanol-water yields 2.08 g. (85%), melting point 156–158° C.

EXAMPLE XII

*Preparation of t-butyloxycarbonyl-L-prolyl-L-phenylalanine p-nitrobenzyl ester*

A solution of 22.90 g. (0.050 mole) of p-nitrobenzyl-L-phenylalaninate benzenesulfonate [J. E. Shields et al., J. Org. Chem., 26, 1491 (1961)] in 100 ml. of chloroform is made by adding 7.64 ml. (5.56 g., 0.55 mole) of triethylamine. The solution is diluted with 800 ml. of ether, giving a crystalline precipitate of 14.6 g. of triethylammonium benzenesulfonate (theory 13.0 g.) which is collected by filtration. Concentrating the filtrate under vacuum gives an oil. The oil is dissolved in 30 ml. of tetrahydrofuran and added to 12.48 g. (0.040 mole) of t-butyloxycarbonyl-L-proline-N-hydroxysuccinimide ester. Not all the solid dissolves. After standing overnight, 3 ml. of triethylamine is added plus enough water to make the solution barely cloudy. The mixture is stirred for 1.5 hours; toward the end of that time, more water is added. Finally the mixture is diluted to 400 ml. with water. An oil forms; cooling overnight at 0° C. gives crystals. These are collected, washed with 0.3 N sulfuric acid and then with water. The pale yellow solid is dissolved in 50 ml. of tetrahydrofuran and diluted with 300 ml. of water. Cooling causes the precipitated oil to crystallize. The dipeptide is collected and air dried to give 20.3 g. (100% yield), melting point 53–59° C. with softening at 51° C., $[\alpha]_D^{25}$ −37.2°±2.4° (c. 2, ethanol), ultraviolet $\lambda_{max.}$ 265 (L9850).

EXAMPLE XIII

*Preparation of t-butyloxycarbonyl-L-valyl-L-tyrosine ethyl ester*

Ethyl-L-tyrosinate (7.52 g., 0.036 mole) is dissolved in 60 ml. of tetrahydrofuran and 9.42 g. (0.030 mole) of t-butyloxycarbonyl-L-valine N-hydroxysuccinimide ester added. After standing overnight a few ml. of triethylamine are added and enough water to give a cloudy solution. After stirring for one hour to hydrolyze any unreacted valine ester the mixture is diluted to 400 ml. with water. Seeding and cooling causes the oily precipitate to crystallize. The solid is collected, washed with 0.5 N hydrochloric acid, aqueous sodium bicarbonate and water. It is dried in a steam cabinet to give 11.3 g. (91%) of dipeptide, melting point 138–141° C. Recrystallization from ethyl acetate-petroleum ether gives 10.70 g. (87%) of dipeptide, melting point 140–140.5° C., $[\alpha]_D^{25}-19.9°\pm2.5°$ (c. 2, ethanol). The compound has been prepared by the N,N'-carbonyldiimidazole method [R. Paul, J. Org. Chem., 28, 236 (1963)] in 67% yield, melting point 140–140.5° $[\alpha]_D^{25}-20.0\pm1.25°$ (c. 2, ethanol).

EXAMPLE XIV

*Preparation of carbobenzoxyglycyl-L-proline*

A solution of 1.53 g. (.005 mole) of the N-hydroxysuccinimide ester of carbobenzoxyglycine in 10 ml. of dimethoxyethane is added to a solution of 0.865 g. (.0075 mole) of proline and 0.63 g. (.0075 mole) of sodium bicarbonate dissolved in 8 ml. of water at room temperature. After one hour 5 ml. more water is added and the solution is acidified with concentrated hydrochloric acid to pH 2. After 30 minutes chilling, 0.93 g. of crystals, melting point 157–159° C., is collected. From the filtrate with further chilling two small crops are collected which total 0.2 g., melting point 157–158° C. The three fractions are combined and recrystallized from 50 ml. of hot ethyl acetate to give 0.97 g., melting point 158–159° C. and with cooling a second crop of 0.18 g., melting point 157–158° C., total yield 75%.

EXAMPLE XV

*Preparation of carbobenzoxyglycyl-L-tryptophan*

2.04 g. of L-tryptophan, 1.68 g. of sodium bicarbonate and 25 ml. of water are mixed, giving partial solution and a pH about 8. Then a solution of 3.06 g. of the N-hydroxysuccinimide ester of carbobenzoxyglycine in 15 ml. of acetonitrile is added at room temperature. All materials are in solution a short time. After an hour, the solution is concentrated to about ¾ of the original volume on a rotary evaporator under vacuum and with slight warming by a water bath. Acidification with concentrated hydrochloric acid to pH about 1 precipitates a gum. This is extracted into 25 ml. of ethyl acetate and the resulting solution is dried briefly over sodium sulfate. The clear solution is then diluted to cloudiness with petroleum ether (about 35 ml.) and refrigerated. The resulting crystalline solid is collected; weight 2.38 g., melting point 140–142° C. Concentration of the filtrate yields 0.90 g. of somewhat lower melting point; recrystallization of this from about 100 ml. of ethanol-water (1–9) gives 0.77 g., melting point 141–142° C. The combined products are recrystallized from 115 ml. of ethanol-water (1–2) to yield 2.75 g. (70% yield) of pure product, melting point 142–143° C., $[\alpha]_D^{25}+32.9°\pm2.17°$ (c. 2.3, absolute alcohol).

EXAMPLE XVI

*Preparation of carbobenzoxy-L-isoglutaminyl-L-asparagine*

0.75 g. (0.005 mole) of asparagine monohydrate is dissolved in 10 ml. of water with heating, cooled to room temperature and 0.7 ml. (0.005 mole) triethylamine is added. Then 1.89 g. (.005 mole) of the N-hydroxysuccinimide ester of carbobenzoxy-L-isoglutamine dissolved in 20 ml. of tetrahydrofuran is added with stirring at room temperature. After 30 minutes the reaction is diluted with 20 ml. of water and acidified to pH 2 with hydrochloric acid. After overnight chilling, 0.87 g., melting point 179–185° C., is collected. Chilling the filtrate gives 0.5 g., melting point 171–173° C. The two fractions are recrystallized separately from dimethylformamide-acetonitrile (1–2) over a six-day period. When gel-like material forms, it is redissolved by gentle warming and finally crystals form on cooling. The two fractions yield 0.95 g., melting point 187–190° C., and 0.3 g., melting point 184–187° C. (total yield 63%).

EXAMPLE XVII

*Preparation of carbobenzoxyglycyl-L-phenalanylglycine*

0.775 g. (.003 mole) of L-phenylalanylglycine and 0.252 g. (.003 mole) of sodium bicarbonate are dissolved in 8 ml. of water. A solution of 0.6125 g. (.002 mole) of the N-hydroxysuccinimide ester of carbobenzoxyglycine in 8 ml. of dimethoxy ethane is added with stirring at room temperature. After 40 minutes 10 ml. more of water is added and the solution is acidified to pH 2 with hydrochloric acid. Crystals form immediately. After overnight chilling 0.75 g. (94%) of white crystals, melting point 155–160° C. are collected. The product is recrystallized from hot ethyl acetate to give, in two fractions, 0.74 g. (92%), melting point 157–158° C.

EXAMPLE XVIII

*Preparation of carbobenzoxy-L-prolylglycyl-L-phenylalanylglycine*

A solution of 2.79 g. of glycyl-L-phenylalanylglycine and 1.68 g. of sodium bicarbonate in 50 ml. of water plus 25 ml. of ethanol is made by warming, then cooling to room temperature. To this is added a solution of 3.46 g. of the N-hydroxysuccinimide ester of carbobenzoxy-L-proline in 25 ml. of ethanol, also made by warming and cooling to room temperature; 5 ml. of wash ethanol is also used. The resulting solution is allowed to stand for 18 hours. Then it is acidified to pH about 1.5 by the addition of hydrochloric acid. Some of the ethanol is removed by vacuum distillation and an oil precipitates from the remaining solution. This solidifies on refrigeration and it is filtered off; dry weight 4.53 g. (89% of the theoretical 5.11 g.), melting point 148–152° C. Recrystallization from 105 ml. of water plus 35 ml. of alcohol gives the pure tetrapeptide derivative, weight 3.87 g. (76% yield), melting point 154–155° C. Working up the filtrate gives 0.25 g. more, making 4.12 g. in all (80% yield); $[\alpha]_D^{25}-27.6°\pm2.5°$ (c. 2, dioxane).

EXAMPLE XIX

*Preparation of carbobenzoxy glycyl-L-proline*

A solution of 1.77 g. (0.005 mole) of the N-hydroxyphthalimido ester of carbobenzoxyglycine in 25 ml. of dimethoxyethane is added to a solution of 0.575 g. (0.005 mole) of proline and 0.42 g. (.005 mole) of sodium bicarbonate in 8 ml. of water at room temperature. The solution remains clear although a bright red color forms immediately. After 10 minutes another 15 ml. of water is added. The solution is acidified very slowly with concentrated hydrochloric acid and fractions are collected at various pH's as follows.

| | M.P. |
|---|---|
| pH 6 (0.25 g.) | 160° |
| pH 4 (0.05 g.) | 160° |
| pH 3 (0.98 g.) | 145–8° |

The change of color in the solution can be observed as the pH decreases. The solution is colorless at pH 3.

The last fraction is redissolved in 10 ml. of 10% sodium bicarbonate and the slow acidification is repeated. At pH 4-4.5 the solution is slightly yellow and a small fraction 0.15 g. melting point 223-226 is collected. The filtrate is now acidified to pH 2 and 0.65 g. melting point 151-154 is collected. This filtrate on chilling yields another 0.05 g. melting point 145-150. Total yield of still impure dipeptide is 0.70 g. (45%). Pure carbobenzoxy-glycyl-L-proline has a melting point of 157-158° C.

EXAMPLE XX

Preparation of carbobenzoxy-L-prolylglycine

A solution of 1.97 g. (.005 mole) of the N-hydroxyphthalimidoester of carbobenzoxy-L-proline in 9 ml. of dimethoxyethane is added to a solution of 0.375 g. (.005 mole) glycine and 0.42 g. (.005 mole) sodium bicarbonate in 7 ml. of water with stirring at room temperature. An additional 2 ml. of dimethoxyethane is added to maintain a clear solution. After 50 minutes the solution is concentrated in vacuum to remove dimethoxyethane. The aqueous reaction mixture is acidified to pH 5 with concentrated hydrochloric acid and filtered to yield 0.72 g., melting point 188° C. The filtrate is acidified further to pH 2 and filtered to give 0.43 g. (28% of the theo. 153 g. of peptide), melting point 106-108° C.

Thin layer chromatography indicates that both fractions are mixtures of carbobenzoxy-L-prolylglycine and N-hydroxyphthalimide. An attempt is made to separate the two using fractional crystallization from chloroform. Both fractions are treated with chloroform and the insoluble portions filtered off. The first gives 0.44 g., melting point 225-226° C. and the second 0.03 g. melting point 224-226° C. The chloroform filtrates are evaporated to dryness and chromatographed to show that both fractions are still mixtures. N-hydroxyphthalimide melts at 225-226° C. and carbobenzoxy-L-prolylglycine at 124-125° C.

I claim:
1. A compound of the formula:

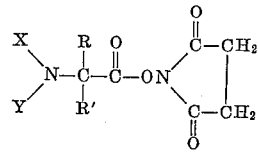

wherein X is selected from the group consisting of benzyloxycarbonyl, tertiary butyloxycarbonyl, triphenylmethyl and trifluoroacetyl, Y is hydrogen and X and Y taken together represent phthaloyl and R and R' represent the residue remaining of a naturally occurring α-amino acid.

2. A compound in accordance with claim 1 in which the α-amino acid is a naturally occurring α-amino acid.

3. A compound in accordance with claim 1 in which the α-amino acid is glycine.

4. The N-hydroxysuccinimide ester of carbobenzoxy glycine.

5. The N-hydroxysuccinimide ester of tert-butyloxycarbonyl-L-alanine.

6. The N-hydroxysuccinimide ester of tritylglycine.

References Cited by the Examiner

UNITED STATES PATENTS

| | | | |
|---|---|---|---|
| 1,915,334 | 6/1933 | Salzberg et al. | 260—243 |
| 2,075,359 | 3/1937 | Salzberg et al. | 167—22 |
| 2,498,665 | 2/1950 | Emerson | 260—112.5 |
| 2,617,795 | 11/1952 | Vaughan | 260—112.5 |
| 2,816,111 | 12/1957 | Wegler et al. | 260—293.4 |
| 3,004,987 | 10/1961 | Paris et al. | 260—326.3 |
| 3,105,080 | 9/1963 | Hickner | 260—326.3 |

OTHER REFERENCES

Nefkens et al.: J. Am. Chem. Soc., vol. 83, March-April, p. 1263 (1961).

Nefkens et al.: "Rec. Tra. Chim.," vol. 82, pp. 683-690 (1962).

ALEX MAZEL, Primary Examiner.

JOSE TOVAR, P. A. STITH, Assistant Examiners.